United States Patent
Gunther et al.

[15] 3,644,048
[45] Feb. 22, 1972

[54] BRIGHTNESS INDICATING COMPARISON DEVICE

[72] Inventors: Hans Gunther, Unterhaching; Georg Konigl; Hans Kortner, both of Muenchen, all of Germany

[73] Assignee: AGFA-Gevaert Aktiengesellschaft, Leverkusen, Germany

[22] Filed: June 23, 1970

[21] Appl. No.: 49,038

[30] Foreign Application Priority Data

June 27, 1969 Germany..................P 19 32 751.6

[52] U.S. Cl..............................................356/329, 356/330
[51] Int. Cl...........................................................G01j 1/10
[58] Field of Search................................356/229–231, 173, 356/178, 186, 190

[56] References Cited

UNITED STATES PATENTS

| 2,172,634 | 9/1939 | Axtell | 356/231 |
| 1,494,548 | 5/1924 | Ives | 356/230 |

FOREIGN PATENTS OR APPLICATIONS

| 736,676 | 9/1955 | Great Britain | 356/231 |

*Primary Examiner*—Ronald L. Wibert
*Assistant Examiner*—F. L. Evans
*Attorney*—Michael S. Striker

[57] ABSTRACT

Reference light having a first color within a predetermined spectral range is combined with a colored part of the light to be measured which has passed through a filter having a second color within a spectral range complementary to the predetermined range. When the combined light assumes a third color, the brightness of the measured light is equal to the predetermined brightness of the reference light. Reflecting grid surfaces are used for deflecting the reference light into the path of the colored part of the measured light.

10 Claims, 3 Drawing Figures

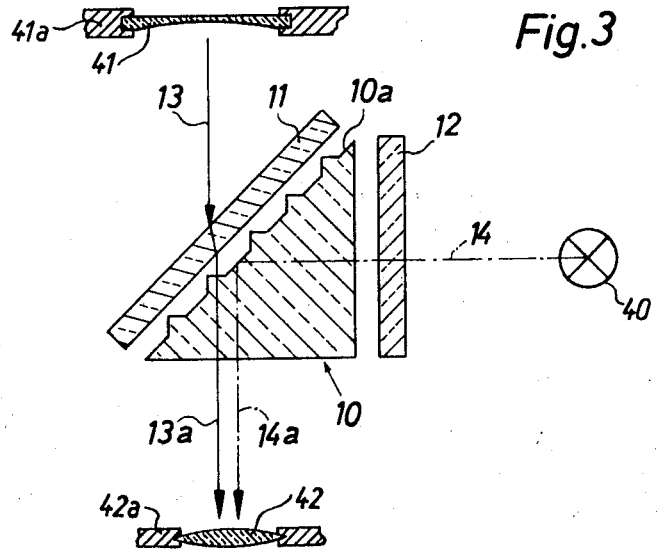

BRIGHTNESS INDICATING COMPARISON DEVICE

BACKGROUND OF THE INVENTION

The present invention relates to a photometric device by which the brightness of light whose brightness is to be measured, is compared with the brightness of reference light.

SUMMARY OF THE INVENTION

It is the object of the invention to provide a photometric device which clearly indicates when the brightness of measured light is equal to a predetermined brightness of reference light.

Another object of the invention, is to indicate equality of the brightness of a measured light with the brightness of a reference light, by a color change.

Another object of the invention is to provide a brightness measuring device of simple construction which can be inexpensively manufactured, and can be advantageously used for photographic and motion picture cameras.

In accordance with the invention, an indicator is provided which includes at least one color filter, and light reflecting or deflecting grid means. The indicator compares a predetermined visible spectral range of the measured light with a complementary spectral range of a reference light. Preferably, the side of the indicator facing the measured light is provided with a color filter whose color is complementary to the color of the reference light. In one embodiment of the invention the side of the indicator facing the reference light is formed as a reflecting grid.

In another embodiment of the invention, the side of the indicator facing the reference light is constructed as a plate having a surface formed of a grid of prism reflecting faces. In another embodiment, the side of the indicator facing the reference light, is constructed as a prism with a reflecting grid surface.

If the reference light is white, a color filter is used whose color is complementary to the color filter of the measured light.

In another embodiment of the invention, the side of the indicator facing a source of white reference light, is constructed as a reflecting grid which reflects the visible spectral range of the reference light which is complementary to the spectral range of the colored part of the measured light which has passed through the respective color filter.

One embodiment of the invention comprises means for producing reference light having a first color within a predetermined spectral range, and a predetermined brightness; filter means located in the path of other light whose brightness is to be measured, and permitting passage of only the colored part of the measured light which has a second color within a spectral range complementary to the predetermined range; and deflecting grid means preferably including reflecting means, for combining the colored part of the measured light with the reference light so that the combined light has a third color when the brightness of the measured light is equal to the predetermined brightness of the reference light. The reference light may be emitted by a colored source of light having a predetermined brightness, or is the colored part of the white reference light passing through a filter having a color within the predetermined spectral range.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 2 is a fragmentary schematic view illustrating a second embodiment of the invention; and FIG. 3 is a fragmentary schematic view illustrating a third embodiment of the invention,

DESCRIPTION OF THE PREFERRED EMBODIMENTS

Figure 1:
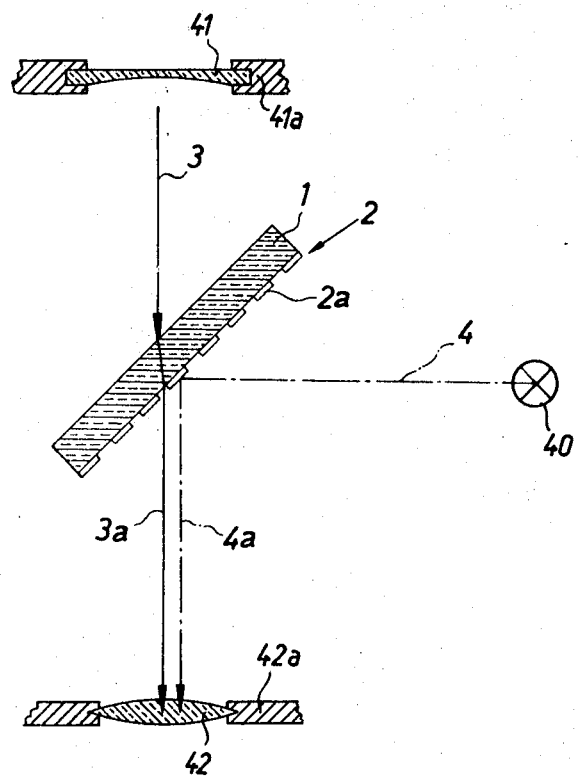
FIG. 1 is a fragmentary schematic view illustrating a first embodiment of the invention.

Referring now to FIG. 1, light to be measured 3 passes through a lens 41 in a mounting ring 41a, and impinges a green filter 1 at an angle of 45°, so that the colored part of the light 3a which has passed through the green filter 1, is green within a certain spectral range determined by the filter 1. A reflecting grid 2 is attached to the side of the green filter 1 which faces the source of reference light 4 which impinges the bars 2a of the reflecting grid at an angle of 45°, so that the reference light is reflected as a colored reference light 4a.

In one modification of the embodiment of FIG. 1, the source 40 of reference light 4 is a red lamp so that reference light 4 is red, and the reflected beam 4a is also red.

In another embodiment of the invention, the source 40 of reference light is white, and the reflecting grid 2 reflects only the red part 4a of the reference light 4.

In any event, the green light 3a and the red light 4a are combined, and are observed through a lens 42 in a mounting ring 42a. Since the spectral ranges of the green light 3a and of the red light 4a are complementary, the combined light formed by the green light 3a and red light 4a becomes yellow when the intensity and brightness of the green light 3a and red light 4a are equal. If the intensity of the measured light 3a is greater than the intensity of the reference light 4a, green light will be seen. If the intensity of the measured light 3a is less than the intensity of the reference light 4a, red light will be observed.

The transparency of the reflecting grid 2, and/or the width of the reflecting bars 2a of the reflecting grid 2 is selected in accordance with the prevailing conditions and the properties of filter 1.

The measuring of intensity and brightness in accordance with the invention is particularly suitable for photographic cameras, since the observing eye notices a change in color much more clearly and faster than it is capable of comparing two beams of white light for the purpose of determining which one is brighter.

The indicator of the invention can be manufactured in a very simple and inexpensive manner. The reflecting grid 2 can be vaporized onto the surface of filter 1, or preferably by printing on filter 1 by means of an aluminum coated printing foil. Filter 1, which also serves as the carrier for the reflecting grid 2, is advantageously made of a synthetic material. The reflecting faces of the reflecting grid 2 must be colored to reflect colored light of a selected range of the spectrum when a white source of reference light 40 is used, so that the color is reflected which is complementary to the color of the filter 1.

It is evident that the colors can be reversed, and that the reference light 4, or the reflecting grid 2 may be green, while filter 1 is red. It is also possible to use a green reflecting grid confronting the measured light 3, while a red filter faces the white source of light 40.

In the embodiment of FIG. 2, an indicator includes two color filters 5 and 6, and a plate 17 having a surface confronting filters 5 and 6 and forming a grid of prism faces. Light to be measured 7 passes through lens 41 and the green filter 5, and white reference light 8 from a source 40 passes through lens 41 and the red filter 6. Filters 5 and 6 have complementary spectral ranges. The green light 7, and the red light 8 impinge the prism surface of plate 17, and are deflected as combined light bundles 7a and 8a along a common path. When the intensity of the measured light is equal to the intensity of the reference light, neither green not red is observed through lens 42, but yellow, so that the brightness and intensity of the measured light is accurately determined.

In the embodiment of FIG. 3, the indicator includes the prism 10, having two surfaces at right angles, and a surface slanted at 45° and provided with prism faces forming a grid. Some of the prism faces extend in the general direction of surface 10a, while others are slanted at 45° to the same, and at right angles to each other. A green filter 11 is provided adjacent and parallel to surface 10a, while a red filter 12 is disposed parallel and adjacent one side of prism 10. The measured light 13 passes partly through the green filter 11, which has a predetermined spectral range, and is directed by surface 10a in the direction 13a. The source of reference light emits white light 14 which passes through the red filter 12 so that only red reference light within a range of the spectrum complementary to the spectral range of filter 11 enters prism 10 and is reflected by surface 10a as red light 14a in the direction of the green part 13a of the measured light. When the red and green light 14a and 13a combine in lens 42, an observer sees yellow when the intensity of the measured light 13 is equal to the intensity of the reference light 14. When the intensities are different, red or green light is observed.

It will be understood that each of the elements described above, or two or more together, may also find a useful application in other types of photometric devices differing from the types described above.

While the invention has been illustrated and described as embodied in a brightness indicating comparison device comparing colored components of light to be measured and reference light, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. Brightness indicating comparison device comprising means for producing colored reference light having a first color within a predetermined spectral range, and a predetermined brightness; filter means located in the path of other light whose brightness is to be measured, and permitting passage of only the colored part of said measured light which has a second color within a spectral range complementary to said predetermined spectral range; and deflecting grid means for combining said colored part of said measured light with said colored reference light so that the combined light has a third color when the brightness of said measured light is equal to said predetermined brightness.

2. A device as claimed in claim 1 wherein said deflecting grid means include reflecting means.

3. A device as claimed in claim 1 wherein the rays of said reference light and of said other light extend at an angle to each other; wherein said filter means include a filter having said second color and being slanted to the directions of the rays of said reference light and of the measured light, said filter having first and second surfaces impinged by said reference light and by the measured light, respectively; wherein said deflecting grid means include a reflecting grid on said first surface of said filter facing said reference light so that said reference light is reflected in the direction in which said part of said measured light leaves said filter.

4. A device as claimed in claim 1 wherein said means for producing reference light include a source of light having said first color.

5. A device as claimed in claim 1 wherein said means for producing reference light include a source of light and a filter having said first color.

6. A device as claimed in claim 1 wherein said deflecting grid means include a plate having a surface impinged by said reference light and by said colored part of said measured light, said surface forming a grid of prism faces for deflecting the rays of said reference light, and the rays of said part of said measured light passing therethrough to combine in a common path.

7. A device as claimed in claim 6 wherein said means for producing said reference light include a source of white light and a first filter having said first color; wherein said filter means include a second filter having said second color and being located in the same plane as said first filter; and wherein said surface with said grid of prism faces confronts said first and second filters, and is parallel to the same.

8. A device as claimed in claim 1 wherein said deflecting grid means include a prism having a first surface facing said reference light, and a second surface facing said filter means, said second surface having a grid of deflecting prism faces disposed so that said colored part of the measured light leaves said prism through a third surface of the same along a path, and so that said reference light passing through said first surface to said second surface is reflected thereby to pass through said third surface along said path to blend with said part of said measured light.

9. A device as claimed in claim 8 wherein said means for producing a reference light include a source of light and a first filter located adjacent said first surface of said prism; wherein said filter means include a second filter located adjacent said second surface; wherein said source of light emits rays perpendicular to the rays of said measured light; wherein said first and third surfaces are perpendicular to each other; and wherein reflecting portions of said second surfaces are slanted an angle of 45° to the rays of said reference light, and said deflecting prism faces are perpendicular to the rays of said colored part of said measured light.

10. A device as claimed in claim 3, wherein said means for producing reference light include a source of white light; and wherein said reflecting grid has said first color.

* * * * *